(12) United States Patent
Shen et al.

(10) Patent No.: US 12,514,434 B2
(45) Date of Patent: Jan. 6, 2026

(54) MAGNETIC CONTROL DEVICE AND CONTROL SYSTEM OF CAPSULE ENDOSCOPE

(71) Applicants: Ankon Medical Technologies (Shanghai) Co., LTD., Shanghai (CN); ANX IP HOLDING PTE. LTD., Singapore (SG)

(72) Inventors: Yueyue Shen, Shanghai (CN); Shaobang Zhang, Shanghai (CN); Xiaodong Duan, Pleasanton, CA (US)

(73) Assignees: ANKON MEDICAL TECHNOLOGIES (SHANGHAI) CO., LTD., Shanghai (CN); ANX IP HOLDING PTE. LTD, Singapore (SG)

( * ) Notice: Subject to any disclaimer, the term of this patent is extended or adjusted under 35 U.S.C. 154(b) by 391 days.

(21) Appl. No.: 18/015,533

(22) PCT Filed: Jul. 9, 2021

(86) PCT No.: PCT/CN2021/105572
§ 371 (c)(1),
(2) Date: Jan. 10, 2023

(87) PCT Pub. No.: WO2022/007960
PCT Pub. Date: Jan. 13, 2022

(65) Prior Publication Data
US 2023/0255454 A1    Aug. 17, 2023

(30) Foreign Application Priority Data
Jul. 10, 2020   (CN) .................. 202010665062.X (51) Int. Cl.
*A61B 1/00*   (2006.01)
*A61B 1/04*   (2006.01)

(52) U.S. Cl.
CPC .......... *A61B 1/00158* (2013.01); *A61B 1/041* (2013.01)

(58) Field of Classification Search
CPC .. A61B 1/00133; A61B 1/00158; A61B 1/041
See application file for complete search history.

(56) References Cited

U.S. PATENT DOCUMENTS

2005/0062562 A1    3/2005   Ries
2008/0300458 A1*  12/2008  Kim .................. A61B 1/00158
                                                              600/118

(Continued)

FOREIGN PATENT DOCUMENTS

CN       103222842 A      7/2013
CN       109091098 A     12/2018

*Primary Examiner* — Aaron B Fairchild
(74) *Attorney, Agent, or Firm* — Treasure IP Group, LLC (57) ABSTRACT

A magnetic control device comprises an upper support and a lower support, wherein the upper support comprises a first mounting space and a second mounting space; a magnetic component mounted on the lower support for driving the capsule endoscope; a first rotation assembly mounted on the lower support for driving the magnetic component to rotate around a first rotation axis, wherein the first rotation assembly comprises a first motor and at least part of the first motor is located in the second mounting space; a second rotation assembly mounted on the lower support and the upper support for driving the magnetic component and the first rotation assembly to rotate around a second rotation axis, the second rotation assembly comprises a second motor and at least part of the second motor is located in the first mounting space; the first rotation axis and the second rotation axis have an angle therebetween.

15 Claims, 5 Drawing Sheets

(56) References Cited

U.S. PATENT DOCUMENTS

2015/0018614 A1\* 1/2015 Duan ................ A61B 1/00158
                                                                         600/109
2015/0380140 A1\* 12/2015 Duan ................ A61B 1/00158
                                                                         600/109

\* cited by examiner

MAGNETIC CONTROL DEVICE AND CONTROL SYSTEM OF CAPSULE ENDOSCOPE

CROSS-REFERENCE OF RELATED APPLICATIONS

The application is a National Phase Application of PCT International Application No. PCT/CN2021/105572, International Filing Date Jul. 9, 2021, published Jan. 13, 2022 as International Publication Number WO2022/007960A1, which claims priority from Chinese Patent Application No. 202010665062.X, filed Jul. 10, 2020, all of which are incorporated herein by reference in their entirety.

FIELD OF INVENTION

The present invention relates to the technical field of medical device, and more particularly to a magnetic control device and a control system of a capsule endoscope.

BACKGROUND

At present, capsule endoscopy is a relatively advanced diagnostic and therapeutic means on the market for routine examination of human digestive tract. Compared with traditional intubation endoscope, swallowing a capsule endoscope does not cause physical and psychological discomfort to a patient, and also reduce the possibility of cross-infection.

Magnetically controlled capsule endoscope is a capsule endoscope that enables an active control of the examination field of view by an operator on a control console. At present, a common means for control is to place a magnet outside a human body, and through an orderly changing magnetic field around the magnet caused by changing the orientation and posture of the magnet, a magnet built in the magnetically controlled capsule endoscope is controlled to drive the capsule endoscope to move, so as to realize a change of the examination field of view of the capsule endoscope. However, that structure of an existing electrically-controlled magnetic control device (for example, including a servo motor, a reducer, an encoder, etc.) is relatively complicated, which causes the magnetic control device to be relatively large in size and relatively high in cost.

Therefore, there is an urgent need for a magnetic control device and a control system of a capsule endoscope to solve the above problems.

SUMMARY OF THE INVENTION

The present invention provides a magnetic control device and a control system of a capsule endoscope, so as to reduce the volume and the cost of the magnetic control device.

In a first aspect, the present invention provides a magnetic control device of a capsule endoscope, which is used for adjusting the state and/or action of the capsule endoscope, comprises:
 an upper support and a lower support, wherein the lower support is rotatably mounted on the upper support, the upper support comprises a first mounting space, and a second mounting space is formed between the upper support and the lower support;
 a magnetic component mounted on the lower support for driving the capsule endoscope to move;
 a first rotation assembly mounted on the lower support for driving the magnetic component to rotate around a first rotation axis, wherein the first rotation assembly comprises a first motor, and at least part of the first motor is located in the second mounting space;
 a second rotation assembly mounted on the lower support and the upper support for driving the magnetic component and the first rotation assembly to rotate around a second rotation axis, wherein the second rotation assembly comprises a second motor, and at least part of the second motor is located in the first mounting space;
 the first rotation axis and the second rotation axis have an angle therebetween.

In one possible design, the upper support at least comprises a first mounting plate, a second mounting plate and a third mounting plate, and the first mounting plate, the second mounting plate and the third mounting plate enclose a U-shaped first mounting space.

In one possible design, the lower support comprises a third housing and a mounting portion, wherein the mounting portion is located between the upper support and a third housing, the mounting portion is rotatably mounted on the upper support, and the mounting portion is located within a projection range of the third housing and the upper support along the second rotation axis; and
 at least part of the magnetic component is mounted on the third housing, and the first motor is mounted on the mounting portion.

In one possible design, the third housing is a partially spherical structure.

In one possible design, the second rotation assembly comprises a second transmission portion and the second transmission portion comprises a transmission shaft arranged along the second rotation axis; and
 one end of the transmission shaft is connected to the second motor, and the other end of the transmission shaft is fixed to the lower support.

In one possible design, the second transmission portion further comprises a support member connected to the transmission shaft, and a second bearing is sleeved around an outer circumference of the transmission shaft; and
 the support member is disposed between the second bearing and the transmission shaft.

In one possible design, the first rotation assembly is mounted on a side of the lower support where the magnetic component is not disposed.

In one possible design, the magnetic component comprises a magnet and a mounting cavity, and the magnet is mounted in the mounting cavity; and
 the mounting cavity is provided with a rotation shaft along the first rotation axis, the lower support is provided with a first through hole along the direction of the first rotation axis, and the rotation shaft passes through the first through hole.

In one possible design, the lower support comprises two first through holes arranged opposite to each other along the direction of the first rotation axis;
 the rotation shaft comprises a first rotation shaft and a second rotation shaft, wherein the first rotation shaft passes through one of the first through holes, and the second rotation shaft passes through the other first through hole; and
 the first rotation shaft is connected to the first motor through a first transmission portion.

In one possible design, the lower support further comprises a first end cap and a second end cap, wherein the first end cap and the second end cap are respectively disposed at the two first through holes and connected to the third housing of the lower support;

the first rotation shaft is rotatably disposed on the first end cap, and the first transmission portion is fixed on the first end cap; and the second rotation shaft is rotatably disposed on the second end cap.

In one possible design, the mounting cavity at least comprises a first housing and a second housing, wherein the first housing and the second housing enclose an inner cavity of the mounting cavity; and the first rotation shaft is provided in the first housing, and the second rotation shaft is provided in the second housing.

In one possible design, at least one of the first motor and the second motor is a stepper motor; and the torques of the first motor and the second motor are not less than 0.7 N·m.

In one possible design, the magnetic control device further comprises at least one rotation origin detection mechanism for determining whether the magnetic component is at an origin of rotation; and the rotation origin detection mechanism comprises a switch assembly electrically connected to the first motor and/or the second motor, and a switch mating part cooperates with the switch assembly, and when the magnetic component is at the origin of rotation, a control circuit of the switch assembly is turned off.

In one possible design, the rotation origin detection mechanism comprises a first rotation origin detection mechanism, which is mounted at the connection between the magnetic component and the lower support and comprises a first switch assembly and a first switch mating part; and the first switch assembly is mounted on one of the magnetic component and the lower support, the first switch mating part is mounted on the other of the magnetic component and the lower support, and the first switch assembly and the first switch mating part control the start and stop of the first motor through a relative rotation.

In one possible design, the rotation origin detection mechanism comprises a second rotation origin detection mechanism, which is mounted at the connection between the upper support and the lower support, and comprises a second switch assembly and a second switch mating part; and the second switch assembly is mounted on one of the upper support and the lower support, the second switch mating part is mounted on the other of the upper support and the lower support, and the second switch assembly and the second switch mating part control the start and stop of the second motor through a relative rotation.

In one possible design, the switch assembly is a photoelectric switch, and the switch mating part is provided with a detection part; and with a relative rotation between the photoelectric switch and the switch mating part, when the photoelectric switch detects the detection part, a control circuit of the photoelectric switch is turned off, and the magnetic component stops at the origin of rotation.

In one possible design, the magnetic control device further comprises a slip ring, and the slip ring comprises an upper slip ring and a lower slip ring;

the upper slip ring is mounted on the upper support and is electrically connected to a power supply, and the lower slip ring is mounted on the lower support and is electrically connected to the first motor; and the slip ring is a PCB type slip ring, and the thickness of the PCB type slip ring is less than or is equal to 10 mm.

In a second aspect of the present invention, a control system of a capsule endoscope is provided, the control system comprises the magnetic control device and a position adjusting device for adjusting the position of the magnetic control device.

Therefore, in the present invention, when at least part of the first motor is located in the second mounting space and at least part of the second motor is located in the first mounting space, the internal spaces of the upper support and the lower support and the space between the upper support and the lower support can be reasonably utilized, so that the external space occupied by the first motor and the second motor is reduced, the structure is more compact, and the magnetic control device is easy to move. Meanwhile, the first mounting space can play a certain role in protecting the second motor, so that the risk of damage to the second motor is reduced, and the service life of the magnetic control device is prolonged.

It should be understood that the above description and the details to be set forth in the following text are only exemplary, which are not intended to limit the present invention.

BRIEF DESCRIPTION OF THE DRAWINGS

FIG. 2 comprises FIG. 2a and FIG. 2b, which are sectional views of the magnetic control device shown in FIG. 1.

MARKS IN THE DRAWINGS

L1—First rotation axis;
L2—Second rotation axis;
X—Horizontal direction;
Y—Vertical direction;
1—Magnetic component;
11—Magnet;
12—Mounting cavity;
121—First housing;
122—Second housing;
2—First rotation assembly;
20—First motor;
211—First rotation shaft;
221—Second rotation shaft;
23—First transmission portion;
231—First coupling;
232—Driving pulley;
233—Conveyor belt;
234—Driven pulley;
235—Tension pulley;
236—Bearing sleeve;
237—Third bearing;
24—First end cap;
25—Second end cap;
26—First bearing;
3—Second rotation assembly;

30—Second motor;
301—Support post;
302—Fixing plate;
31—Lower support;
311—Third housing;
312—Mounting portion;
312a—Stop plate;
313—Second mounting space;
32—Second transmission portion;
321—Transmission shaft;
321a—Stop disk;
322—Support member;
323—Second bearing;
324—Second coupling;
41—Upper support;
411—First mounting space;
412—First mounting plate;
413—Second mounting plate;
414—Third mounting plate;
42—Upper cover plate;
43—Suspension member;
5—Slip ring;
51—Upper slip ring;
52—Lower slip ring;
6—Rotation origin detection mechanism;
61—First rotation origin detection mechanism;
611—First switch assembly;
611a—Groove;
612—First switch mating part;
612a—Detection part;
62—Second rotation origin detection mechanism;
621—Second switch assembly;
622—Second switch mating part.

The drawings herein are incorporated in and constitute a part of the specification, illustrate the embodiments consistent with the present invention and are used together with the specification to explain the principles of the present invention.

DETAILED DESCRIPTION

The present invention can be understood and appreciated more fully from the following detailed description taken in conjunction with the accompanying drawings.

It should be clear that the described embodiments are only part of the embodiments of the present invention. Based on the embodiments in the present invention, all other embodiments obtained by ordinary technicians in the art without doing creative work belong to the scope of protection in the present invention.

The present invention is described in detail below with reference to the accompanying drawings and preferred embodiments.

Figure 1:
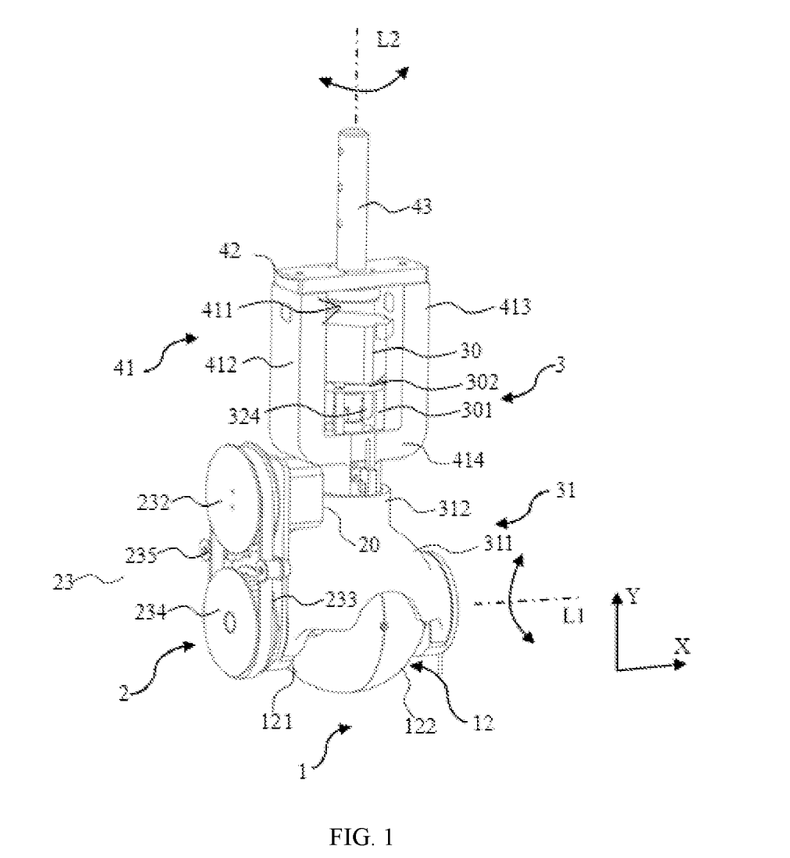
FIG. 1 is a schematic view showing a three-dimensional structure of a magnetic control device of a capsule endoscope according to the embodiments of the present invention.
Figure 2A:
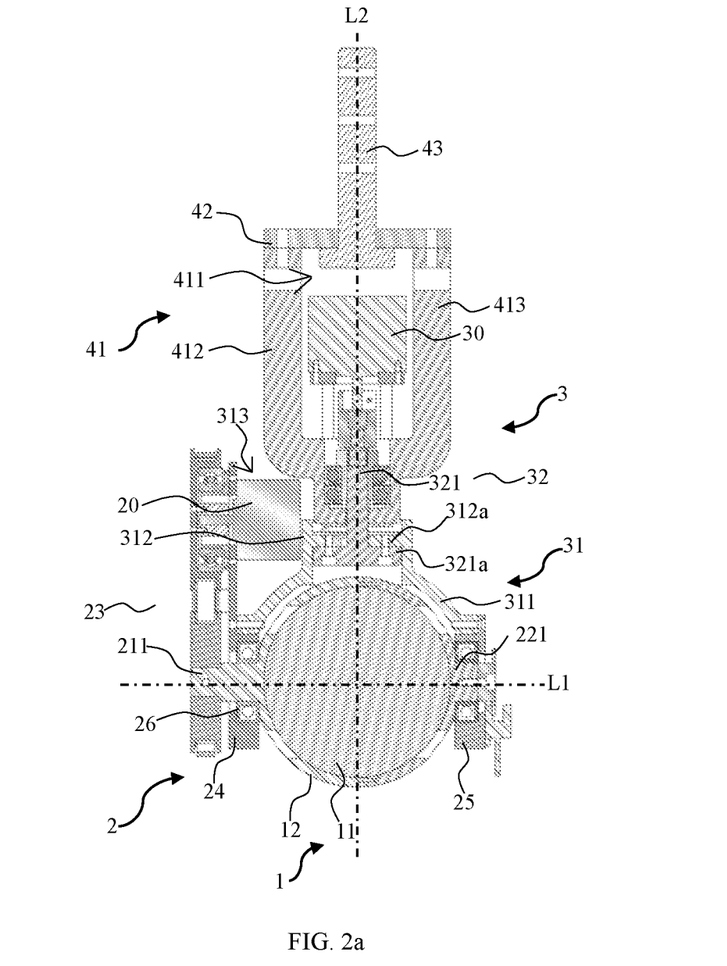
Figure 2B:
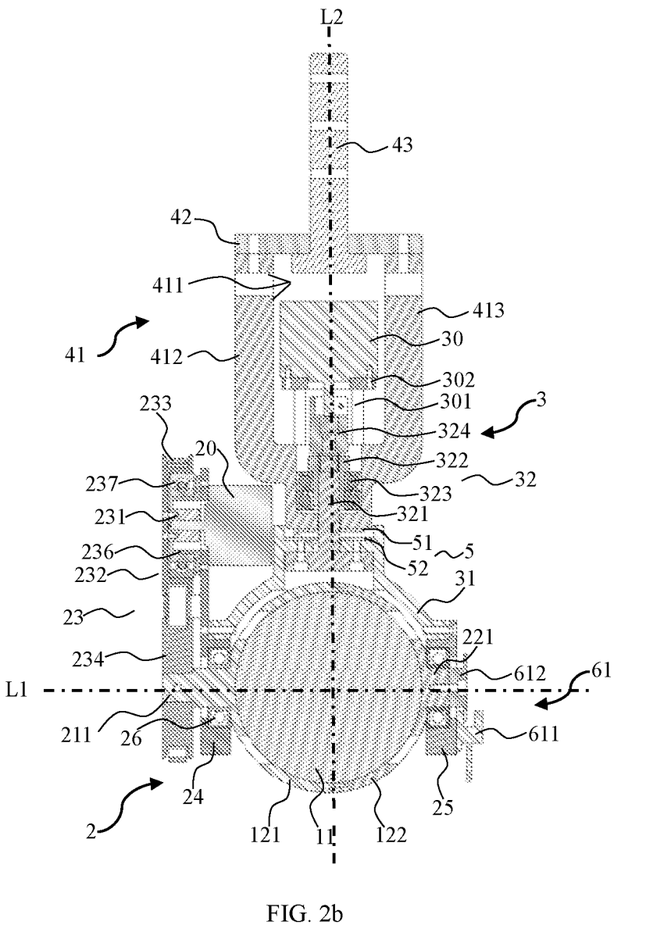
Figure 3:
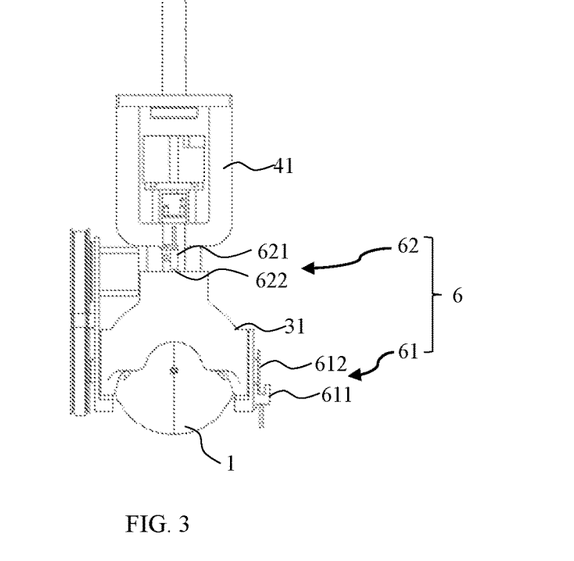
FIG. 3 is a front view of the magnetic control device shown in FIG. 1.

Referring to FIGS. 1-3, a magnetic control device of a capsule endoscope in an embodiment of the present invention is used for adjusting the state of a capsule endoscope (not shown in the FIGs). The magnetic control device comprises an upper support 41, a lower support 31, a magnetic component 1, a first rotation assembly 2 and a second rotation assembly 3. The upper support 41 is used for hoisting the magnetic control device. The magnetic component 1 is connected to the lower support 31 (including direct connection or indirect connection through other components), and is used to drive the capsule endoscope to rotate. The first rotation assembly 2 is connected to the lower support 31 (including directly connected or indirectly connected through other components). The first rotation assembly 2 comprises a first motor 20 and the first motor 2 is used to drive the magnetic component 1 to rotate around a first rotation axis L1. The second rotation assembly 3 is connected to the upper support 41 and the lower support 31 (including direct connection or indirect connection through other components). The second rotation assembly 3 comprises a second motor 30, and the second motor 30 is used to drive the magnetic component 1 and the first rotation assembly 2 to rotate around a second rotation axis L2. The first rotation axis L1 and the second rotation axis L2 have an angle therebetween.

Therefore, when the first rotation assembly 2 and/or the second rotation assembly 3 rotate, the magnetic component 1 can be driven to rotate. During the rotation of the magnetic component 1, the surrounding magnetic field changes orderly, and then controls the capsule endoscope to move in vivo, so as to adjust the state and action of the capsule endoscope.

Specifically, taking the orientation of the magnetic control device shown in FIG. 1 as an example, the second rotation axis L2 may be parallel to a vertical direction Y, and the first rotation axis L1 may be parallel to a horizontal direction X. Alternatively, when the orientation of the magnetic control device is changed, the first rotation axis L1 may not be parallel to the horizontal direction X, and the second rotation axis L2 may not be parallel to the vertical direction Y. The magnetic control device is described taking the orientation shown in FIG. 1 as an example.

As shown in FIG. 2a, a first mounting space 411 is formed in the upper support 41, and a second mounting space 313 is formed between the upper support 41 and the lower support 31. At least part of the first motor 20 is located in the second mounting space 313, and at least part of the second motor 30 is located in the first mounting space 411. That is, part of the first motor 20 is located in the second mounting space 313, or the entire first motor 20 is located in the second mounting space 313; part of the second motor 30 is located in the first mounting space 411, or the entire second motor 30 is located in the first mounting space 411.

It should be noted that the second mounting space 313 is a space between the upper support 41 and the lower support 31, and the second mounting space 313 not only comprises a space where the upper support 41 and the lower support 31 are directly opposite to each other along the second rotation axis L2, but also comprises a space deviated from a position where the upper support 41 and the lower support 31 are directly opposite to each other. As shown in FIG. 2a, the upper support 41 and the lower support 31 are rotatably connected to each other along the second rotation axis L2, and after connected, the rotation axis between the two is the second rotation axis L2. At this point, the second mounting space 313 is located at one side of the connection between the upper support 41 and the lower support 31, that is, the second mounting space 313 is offset from the second rotation axis L2.

Therefore, in the embodiment, when at least part of the first motor 20 is located in the second mounting space 313 and at least part of the second motor 30 is located in the first mounting space 411, the internal spaces of the upper support 41 and the lower support 31 and the space between the upper support 41 and the lower support 31 can be reasonably utilized, so that the external space occupied by the first motor 20 and the second motor 30 is reduced, the structure is more compact, and the magnetic control device is easy to move. In addition, the first mounting space 411 can protect the second motor 30, thereby reducing the risk of damage to the second motor 30 and prolonging the service life of the magnetic control device.

It should be noted that, in accordance with the embodiments of the present invention, the first motor 20 and the second motor 30 control a first transmission portion 23 and a second transmission portion 32, respectively. Since the first motor 20 is fixed relative to the lower support 31 and the second motor 30 is fixed relative to the upper support 41, when the second motor 30 drives the second rotation assembly 3 to drive the lower support 31 to rotate, the first motor 20 can rotate with the lower support 31. In this case, compared with the case where the first motor 20 does not rotate with the lower support 31 during the rotation of the lower support 31, the arrangement of the embodiment can simplify a transmission chain between the first motor 20 and the lower support 31 (only the two need to be fixedly connected), so that the structure of the magnetic control device is more compact.

Specifically, as shown in FIG. 1, the upper support 41 at least comprises a first mounting plate 412, a second mounting plate 413 and a third mounting plate 414, and the first mounting plate 412, the second mounting plate 413 and the third mounting plate 414 enclose a U-shaped first mounting space 411. The first mounting plate 412 and the second mounting plate 413 are connected to two ends of the third mounting plate 414.

In the embodiment, as shown in FIG. 2a, the second motor 30 is located in the first mounting space 411 enclosed by the upper support 41, so as to improve the space utilization of the upper support 41 and reduce the external space occupied by the upper support 41. The first mounting space 411 can protect the second motor 30, and reduce the risk of the second motor 30 contacting with an external device.

The first mounting plate 412, the second mounting plate 413, and the third mounting plate 414 can be fixedly connected to each other, or can be integrally formed.

In other embodiments of the present invention, the upper support 41 may be formed in other structures such as a cylindrical shape or a prismatic shape, and may also be formed by combining other numbers of mounting plates, which is not described herein, as long as the formed mounting space can be ensured to facilitate the mounting of the second motor 30.

The magnetic control device may further comprise an upper cover plate 42 covering the top of the upper support 41. The upper cover plate 42 is fixedly connected to the first mounting plate 412 and the second mounting plate 413, so that the first mounting space 411 is formed by enclosing the upper cover plate 42, the first mounting plate 412, the second mounting plate 413 and the third mounting plate 414. The space 411 not only has a more compact structure, but also protects the second motor 30 and other components. Further, the magnetic control device further comprises a suspension member 43 penetrating through the upper cover plate 42, and the suspension member 43 is used for suspending the upper support 41, so as to realize the suspension of the magnetic control device. The periphery of the suspension member 43 may be provided with threaded holes or other fixing structure for fixing with a position adjusting device of a control system of the capsule endoscope, for connecting to the position adjusting device of the control system, so as to adjust the position of the magnetic control device by controlling the position adjusting device. The position adjusting device is usually mounted on the ground, the magnetic control device is fixedly suspended on the position adjusting device, and the position adjusting device can drive the magnetic control device to move forward and backward, up and down, and left and right, so as to facilitate examination.

More specifically, as shown in FIG. 1 and FIG. 2b, the second motor 30 is connected to a fixing plate 302 and a support post 301, and the fixing plate 302 is fixedly connected to the second motor 30 (for example, the fixing plate 302 and the second motor 30 can be connected by bolts, or clamped, or welded, etc.). One end of the support post 301 is connected to the fixing plate 302, and the other end abuts against the bottom wall of the upper support 41 (specifically, the support post 301 can abut against the third mounting plate 414 of the upper support 41). The support post 301 can be fixedly connected to the fixing plate 302, and can be fixedly connected to the bottom wall of the upper support 41, so that the second motor 30 can be supported in the first mounting space 411 by the support post 301, and the stability of the second motor 30 can be improved. Further, in some embodiments of the present invention, the support post 301 may be integrally formed with the upper support 41 (or the third mounting plate 414).

Figure 5:
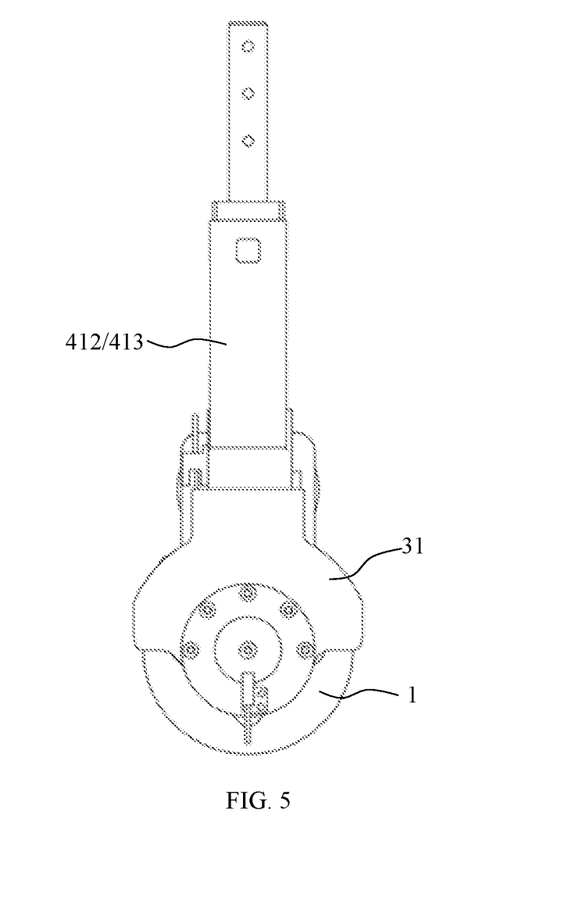
FIG. 5 is a side view of the magnetic control device shown in FIG. 1 in another embodiment.

More specifically, in the embodiment shown in FIG. 5, the second motor 30 does not extend beyond the first mounting plate 412 and the second mounting plate 413, that is, the second motor 30 is completely located in the first mounting space 411. In this case, the first mounting space 411 can effectively protect the second motor 30 from contacting with external structures.

In addition, the upper support 41 may further comprise a fourth mounting plate and a fifth mounting plate (not shown in FIGs). The fourth mounting plate and the fifth mounting plate may be connected to the first mounting plate 412, the second mounting plate 413 and the third mounting plate 414, and block openings of the first mounting space 411, so as to further protect the second motor 30.

In another aspect, as shown in FIG. 2a, the lower support 31 comprises a third housing 311 and a mounting portion 312 which are fixedly connected or integrally formed. At least part of the magnetic component 1 is mounted on the third housing 311, the second motor 30 is connected to the mounting portion 312 through a transmission shaft 321, and the first motor 20 is mounted on the mounting portion 312. The mounting portion 312 is located between the upper support 41 and the third housing 311, and is rotatably mounted on the upper support 41, so that the lower support 31 is rotatably mounted on the upper support 41. The mounting portion 312 is located within a projection range of the third housing 311 and the upper support 41.

In the embodiment, along the direction of the second rotation axis L2, the upper support 41, the mounting portion 312 and the third housing 311 of the lower support 31 all have projections, and the projection of the mounting portion 312 is located within the projection range of the upper support 41 and the projection range of the third housing 311, so that at least part of the first motor 20 mounted on the mounting portion 312 can be located within the projection range of the third housing 311 of the lower support 31 and the upper support 41. In this case, part of the first motor 20 is located within the projection range of the third housing 311 and the upper support 41, or the first motor 20 is completely located within the projection range of the third housing 311 and the upper support 41, so that the first motor 20 can reasonably utilize the space between the upper support 41 and the lower support 31. When the first rotation axis L1 is parallel to the horizontal direction X, the second rotation axis L2 is parallel to the vertical direction Y, and the first motor 20 is completely located within the projection range of the third housing 311 and the upper support 41, the space in the horizontal direction X occupied by the magnetic control device is determined by the upper support 41 and the lower support 31, and the first motor 20 does not increase the space in the horizontal direction X occupied by the magnetic control device, thereby further improving the compactness of the magnetic control device along the horizontal direction X.

In the above embodiments, as shown in FIG. 2b, the second rotation assembly 3 comprises a second transmission portion 32, and the second transmission portion 32 comprises a transmission shaft 321 disposed along the second rotation axis L2. One end of the transmission shaft 321 is connected to an output shaft (not shown in FIGs) of the second motor 30, and the other end of the transmission shaft 321 is fixed to the lower support 31.

In the embodiment, by providing the second transmission portion 32, the rotation of the output shaft of the second motor 30 can be transmitted to the lower support 31, so as to realize the rotation of the lower support 31. In addition, the transmission shaft 321 can prevent the output shaft of the second motor 30 from being directly connected to the lower support 31.

Further, as shown in FIG. 2a and FIG. 2b, the second transmission portion 32 further comprises a support member 322 connected to the transmission shaft 321. A second bearing 323 is sleeved around an outer circumference of the transmission shaft 321, and the support member 322 is disposed between the second bearing 323 and the transmission shaft 321.

Specifically, the support member 322 is fixedly connected to the transmission shaft 321. In one embodiment, the support member 322 may be provided with a mounting hole (not shown in FIGs), and the transmission shaft 321 passes through the mounting hole and is in interference fit with the support member 322, so as to realize a fixed connection between the transmission shaft 321 and the support member 322. Meanwhile, the second bearing 323 is sleeved on the outer periphery of the support member 322, that is, an inner ring of the second bearing 323 is connected to the support member 322, and an outer ring of the second bearing 323 is connected to the inner wall of the upper support 41, so that the support member 322 can rotate relative to the upper support 41 through the second bearing 323, and further the transmission shaft 321 can rotate relative to the upper support 41. In addition, in other embodiments, the support member 322 can also be a support nut. The support nut has internal threads, and one end of the transmission shaft 321 connected to the support nut is designed with external threads, so that the support member 322 and the transmission shaft 321 are fixedly connected through threaded connection.

In the embodiment, depending on the support member 322 and the second bearing 323, the structural strength and safety between the transmission shaft 321 and the second bearing 323 can be increased. Meanwhile, in order to realize the connection between the transmission shaft 321 and the output shaft of the second motor 30, and thereby improve the connection reliability of the two, the second transmission member 32 also comprises a second coupling 324, through which the output shaft of the second motor 30 is connected to the transmission shaft 321.

More specifically, as shown in FIG. 2a, the inner cavity of the mounting portion 312 of the lower support 31 comprises a stop plate 312a. The stop plate 312a has a second through hole, and the transmission shaft 321 extends into the inner cavity of the mounting portion 312 through the second through hole. Meanwhile, the transmission shaft 321 is connected to a stop disk 321a located in the inner cavity of the mounting portion 312. The stop disk 321a abuts against the bottom wall of the stop plate 312a, and the diameter of the stop disk 312a is larger than that of the second through hole, so that the stop disk 321a is limited in the inner cavity of the mounting portion 312 by the stop plate 312a, and the transmission shaft 321 is connected to the lower support 31. In addition, in order to ensure the transmission effect, the stop plate 312a and the stop disk 321a can be fixedly connected by connections such as screws, so as to improve the connection reliability between the transmission shaft 321 and the lower support 31.

In one embodiment, as shown in FIG. 1, the lower support 31 comprises the third housing 311 and the mounting portion 312. The third housing 311 is used for mounting the magnetic component 1. The third housing 311 can be spherical or partially spherical, the mounting portion 312 can be cylindrical, and the mounting portion 312 and the third housing 311 are in arc transition, so as to reduce the stress concentration of the lower support 31 and prolong the service life thereof. In addition, the third housing 311 having a spherical or partially spherical structure (e.g., a semi-spherical shape) can reduce the space occupied by the lower support 31, and thus enlarge the second mounting space 313, and enable more structures to be assembled in the second mounting space 313, thereby making the whole mechanism more compact.

In the embodiment, the third housing 311 may be a hemispherical structure, and the magnetic component 1 is installed in the inner cavity of the hemispherical structure, so as to ensure the installation reliability of the magnetic component 1. In addition, the volume of the third housing 311 with the hemispherical structure is small, and on the premise of ensuring the installation reliability of the magnetic component 1, the volume of the magnetic control device can be further reduced, so as to further realize the purpose of compactness of the magnetic control device.

Specifically, as shown in FIG. 1, the outer contour of the third housing 311 away from the mounting portion 312 may be curved, that is, the third housing 311 may be an irregular partially spherical structure, so that the connection reliability between the third housing 311 and the magnetic component 1 can be improved as much as possible while the volume of the third housing 311 is reduced.

More specifically, as shown in FIG. 1, the first rotation assembly 2 is mounted on a side of the lower support 31 where the magnetic component 1 is not disposed, and each component of the first rotation assembly 2 is disposed close to the first motor 20, so as to facilitate the connection between each component of the first rotation assembly 2 and the first motor 20, and simplify the structure of the first rotation assembly 2.

In some embodiments, as shown in FIG. 2a, the magnetic component 1 comprises a magnet 11 and a mounting cavity 12, wherein the magnet 11 has magnetism, and the magnet 11 can move when there is a changing magnetic field around the magnet 11. The mounting cavity 12 is used for mounting the magnet 11, and when the magnet 11 is fixedly mounted in the inner cavity of the mounting cavity 12, the mounting cavity 12 can protect the magnet 11.

Meanwhile, the mounting cavity 12 is provided with a rotation shaft along the first rotation axis L1, and the lower support 31 is provided with a first through hole along the direction of the first rotation axis L1. The rotation shaft passes through the first through hole, and the rotation shaft can rotate in the first through hole, so as to drive the mounting cavity 12 to rotate, and further drive the magnetic component 1 in the mounting cavity 12 to rotate.

In addition, part of the rotation shaft can extend out of the first through hole and be connected to the first transmission portion 23 of the first rotation assembly 2, so that the rotation shaft is connected to an output shaft of the first motor 20 through the first transmission portion 23, and the rotation shaft is driven to rotate through the output shaft of the first motor 20.

Further, as shown in FIG. 2a, the third housing 311 of the lower support 31 has two first through holes arranged oppositely along the first rotation axis L1. Accordingly, the magnetic component 1 comprises two rotation shafts, that is, a first rotation shaft 211 and a second rotation shaft 221. Both the first rotation shaft 211 and the second rotation shaft 221 extend along the first rotation axis L1 and are located at two sides of the magnetic component 1 along the first rotation axis L1. The first shaft 211 is disposed in one of the first through holes, and the second shaft 221 is disposed in the other of the first through holes. The first rotation shaft 211 and the first motor 20 are located at the same side of the lower housing 31. The first rotation shaft 211 is connected to the first motor 20 through the first transmission portion 23. When the magnetic component 1 is provided with two rotation shafts and the third housing 311 is provided with two first through holes, the stability and reliability of rotation of the first rotation assembly 2 can be improved.

Further, as shown in FIG. 2a, the first rotation assembly 2 may further comprise a first end cap 24 and a second end cap 25. The first end cap 24 and the second end cap 25 are respectively disposed at the two first through holes and fixed to the third housing 311 of the lower support 31 (specifically, the two end caps may be fixed to the third housing 311 by means of bolt connection or clamping, etc.). The first rotation shaft 211 is rotatably disposed on the first end cap 24, and the first transmission portion 23 is fixed to the first end cap 24. Similarly, the second rotation shaft 221 is rotatably disposed on the second end cap 25.

More specifically, the first end cap 24 is provided with a third through hole and the second end cap 25 is provided with a fourth through hole. The third through hole and the fourth through hole can be respectively connected to the corresponding first through hole, so that the rotation shaft can rotate relative to the through holes. Specifically, when the first motor 20 drives the magnetic component 1 to rotate, the first rotation shaft 211 can pass through the corresponding first through hole and the corresponding third through hole, and can rotate relative to the corresponding first through hole and the corresponding third through hole. The second rotation shaft 221 can pass through the corresponding first through hole and the corresponding fourth through hole and can rotate with respect to the corresponding first through hole and the corresponding fourth through hole.

In the embodiment, by providing the first end cap 24 and the second end cap 25, the stability and reliability of rotation of the first rotation assembly 2 can be improved.

Further, as shown in FIG. 2b, a first bearing 26 is disposed between the first rotation shaft 211 and the first end cap 24, and between the second rotation shaft 221 and the second end cap 25, respectively, so that the friction between the rotation shaft and the first through hole, the third through hole, and the fourth through hole is reduced by the first bearing 26, so that the magnetic component 1 can smoothly rotate in the lower support 31.

In the embodiment, when the first bearing 26 is disposed in the two first through holes, the stability and reliability of rotation of the first rotation shaft 211 and the second rotation shaft 221 can be improved, so that the stability and reliability of rotation of the first rotation assembly 2 can be improved, and the magnetic component 1 can rotate more smoothly without great resistance.

In some embodiments, as shown in FIG. 1, the first rotation axis L1 may be in the same direction as the horizontal direction X, and the second rotation axis L2 may be in the same direction as the vertical direction Y. When the magnetic control device is in operation, the first bearing 26 is mainly subjected to a supporting force along the vertical direction Y, and the vertical direction Y is a radial direction of the first bearing 26, that is, the first bearing 26 is subjected to a radial stress. Therefore, the first bearing 26 can be selected as a deep groove ball bearing or an angular contact bearing, so that the first bearing 26 can bear sufficient radial stress. The second bearing 323 (located between the upper support 41 and the transmission shaft 321) is mainly subjected to a supporting force along the vertical direction Y, and the vertical direction Y is an axial direction of the second bearing 323, that is, the second bearing 323 may be subjected to an axial stress. Therefore, the second bearing 323 can be selected as an angular contact bearing, so that the second bearing 323 can bear sufficient axial stress.

Specifically, the first transmission portion 23 of the first rotation assembly 2 can be any structure capable of connecting the first motor 20 and the first rotation shaft 211. For example, as shown in FIG. 1 and FIG. 2b, the first transmission portion 23 may comprise a first coupling 231, a driving pulley 232, a conveyor belt 233, a driven pulley 234, a tension pulley 235, a bearing sleeve 236 and a third bearing 237. The first coupling 231 is respectively connected to the output shaft of the first motor 20 and the driving pulley 232, the driven pulley 234 is connected to the first rotation shaft 211, the conveyor belt 233 is wound around the driving pulley 232 and the driven pulley 234, the tension pulleys 235 are arranged on both sides of the conveyor belt 233, and the bearing sleeve 236 is arranged outside the first coupling 231. The third bearing 237 is disposed outside the bearing sleeve 236. The bearing sleeve 236 is fixed to the first end cap 24, and the first coupling 231, the bearing sleeve 236, and the third bearing 237 can be accommodated between the driving pulley 232 and the first end cap 24, so as to improve the compactness of the magnetic control device. In some embodiments, the third bearing 237 may be a deep groove ball bearing to withstand radial stresses of the third bearing 237.

In the above embodiments, as shown in FIG. 2a and FIG. 2b, the magnetic component 1 comprises a magnet 11 and a mounting cavity 12. The mounting cavity 12 at least comprises a first housing 121 and a second housing 122. When the mounting cavity 12 comprises the first housing 121 and the second housing 122, the first housing 121 and the second housing 122 enclose an inner cavity of the mounting cavity 12. In addition to the first housing 121 and the second housing 122, the mounting cavity 12 may further comprise other structures, for example, a fourth housing (not shown in FIGs). The first housing 121, the second housing 122 and the fourth housing enclose the inner cavity of the mounting cavity 12.

In the embodiment, the first housing 121 and the second housing 122 enclose the inner cavity of the mounting cavity 12, and the magnet 11 is fixed in the inner cavity of the mounting cavity 12. In this way, the first rotation assembly 2 can be connected to the magnet 11, so that the first rotation assembly 2 can drive the magnet 11 to rotate. Meanwhile, the magnet 11 is fixed in the inner cavity of the mounting cavity 12, and the inner cavity can protect the magnet 11, so that the service life of the magnetic control device is prolonged.

In one embodiment, the magnet 11 may be fixed to the first housing 121 and/or the second housing 122 by an external structural member. For example, the first housing 121 and/or the second housing 122 is provided with a mounting hole, the magnet 11 is provided with a threaded hole corresponding to the mounting hole, and the magnet 11 is fixed to the first housing 121 and/or the second housing 122 by a threaded member. In another embodiment, the magnet 11 can also be fixed to the first housing 121 and the second housing 122 through a fitting relationship between the first housing 121 and the second housing 122. For example, when the first housing 121 and the second 122 are fitted to form the mounting cavity 12, the magnet 11 can be completely wrapped, that is, the shape and size of the inner cavity of the mounting cavity 12 fit the shape and size of the magnet 11, so as to realize the connection between the magnet 11 and the first rotation assembly 2, and at this point, it is no longer necessary to fix the magnet 11 and the first rotation assembly 2 through an external structural member. In addition, the first housing 121 and the second housing 122 may be fitted with each other by means of screwing, clamping or riveting, etc., which is not specifically limited herein.

Specifically, as shown in FIG. 2a and FIG. 2b, the first rotation shaft 211 is fixedly connected to or integrally formed with at least one of the first housing 121 and the second housing 122, and the second rotation shaft 221 is fixedly connected to or integrally formed with at least one of the first housing 121 and the second housing 122, so that when the first rotation shaft 211 and the second rotation shaft 221 rotate, the mounting cavity 12 can be driven to rotate. Alternatively, the first rotation shaft 211 can be fixedly connected to the first housing 121 and the second housing 122 in other manners, as long as the first rotation shaft 211 and the mounting cavity 12 rotate simultaneously.

In the above embodiments, at least one of the first motor 20 and the second motor 30 is a stepper motor.

The magnetic control device of the capsule endoscope provided by the present invention drives the first rotation assembly 2 and the second rotation assembly 3 to rotate through the stepper motor, that is, accurate control can be realized without the need of a reducer, an encoder and other components. Therefore, the cost can be reduced, and the overall structure is compact, so that the volume of the magnetic control device can be further reduced, and the cost of the magnetic control device can be reduced.

It can be understood that the structure of the existing magnetic control device controlled by a servo motor is closed-loop control, that is, an encoder is required, and the servo motor is usually used in combination with a reducer, which leads to larger volume and higher cost of the magnetic control device. However, the magnetic control device in the present invention adopts a stepper motor, and the stepper motor is open-loop controlled, that is, an encoder is not needed, and meanwhile, the stepper motor with large torque does not need to be cooperated with a reducer to increase the torque of the stepper motor, so that by adopting the driving mode of the stepper motor, the use of the reducer, the encoder and other components can be avoided, and the volume and the cost of the magnetic control device are reduced.

In some embodiments, the torques of the first motor 20 and the second motor 30 are not less than 0.7 N·m. In this case, it can be roughly considered that the stepper motor is in a high torque state when the magnetic control device is used, so that the stepper motor does not need to adopt a reducer, thus reducing the cost compared with the driving mode of the servo motor.

It can be understood that the magnetic control device provides an external magnetic field for the capsule endoscope by adjusting the state (i.e., angle) of the magnetic component 1, and to ensure the convenience of adjusting the magnetic component 1, for example, the magnetic component 1 can be set to be spherical. In addition, in order to reduce the radiation damage of the magnetic component 1 to human body, the magnet 11 of the magnetic component 1 can be made of a permanent magnet material with less radiation damage to the human body, such as NdFeB, Fe3O4, SmCo or AlNiCo, etc.

Moreover, as shown in FIG. 2a and FIG. 2b, the magnetic control device may further comprise a slip ring 5 located between the upper support 41 and the lower support 31, and the slip ring 5 is used for energizing the first motor 20. Specifically, the slip ring 5 comprises an upper slip ring 51 and a lower slip ring 52, and the upper slip ring 51 and the lower slip ring 52 can rotate relative to each other while ensuring electrical connection therebetween. The upper slip ring 51 is mounted on the upper support 41, and the lower slip ring 52 is mounted on the lower support 31. The upper slip ring 51 is electrically connected to a power supply, and the lower slip ring 52 can be electrically connected to the first motor 20. In a working state, the upper slip ring 51 can energize the lower slip ring 52, so that the first motor 20 in the second mounting space 313 is energized through the upper slip ring 51 and the lower slip ring 52, thereby avoiding the risk that the first motor 20 is connected to the power supply by using a long wire, and the wire is intertwined when rotating with the lower support 31. It should be noted that the above power supply may be a power supply of the magnetic control device in the present invention (including a power supply provided on the magnetic control device), or may be an external power supply on a device for assembling the magnetic control device, or the magnetic control device may be connected to a mains supply, which is not be described here.

The conductive slip ring 5 may be a PCB (Printed Circuit Board) type slip ring, and the thickness of the PCB type slip ring is less than or is equal to 10 mm. Compared with other types of conductive slip ring, the thickness of the PCB type slip ring is smaller, so that the space occupied along the second rotation axis L2 can be reduced, and the magnetic control device 1 is more compact.

In another aspect, in order to facilitate subsequent operations for an operator after the magnetic control device is powered on and initialized, the magnetic control device in the embodiments of the present invention may further comprise at least one rotation origin detection mechanism 6 for determining whether the magnetic component 1 is at an origin of rotation (i.e., the origin of rotation of the magnet 11). The rotation origin detection mechanism 6 comprises a switch assembly electrically connected to the first motor 20 and/or the second motor 30, and a switch mating member cooperates with the switch assembly to control the on/off of a control circuit. After receiving a corresponding command, when the magnetic component 1 is located at the origin of rotation, a control circuit of the switch assembly is turned off, so as to control the first motor 20 and/or the second motor 30 to stop working, and the magnetic component 1 stops at the origin of rotation thereof. When the magnetic component 1 is not located at the origin of rotation, the control circuit of the switch assembly is turned on, thereby controlling the first motor 20 and/or the second motor 30 to work to drive the magnetic component 1 to rotate until the magnetic component 1 rotates to the origin of rotation.

It should be noted that, in the present design, the origin of rotation may be the origin of rotation (also referred to as a first zero point) of the magnetic component 1 around the first rotation axis L1, or may be the origin of rotation (also referred to as a second zero point) of the magnetic component 1 around the second rotation axis L2. In some cases, it may be considered that when the magnetic component 1 is at the first zero point, the N pole of the magnet 11 is facing upward and the S pole of the magnet 11 is facing downward. In other cases, other postures of magnetic component 1 may be used as the zero position, for example, the S pole of the magnet 11 is facing upward, the N pole of the magnet 11 is facing downward, or the like, as long as it is convenient for the magnetic control device to control the capsule endoscope.

In order to detect and control whether the magnetic component 1 moves to the first zero point and/or the second zero point, the embodiment of the present invention may comprise a first rotation origin detection mechanism 61 and a second rotation origin detection mechanism 62. The first rotation origin detection mechanism 61 may be configured to detect whether the magnetic component 1 is located at the first zero point, so as to control the first motor 20 to start or stop. The second rotation origin detection mechanism 62 may be configured to detect whether the magnetic component 1 is located at the second zero point, so as to control the second motor 30 to start or stop.

In one embodiment, the second rotation origin detection mechanism 62 is located between the upper support 41 and the lower support 31. A second switch assembly 621 of the second rotation origin detection mechanism 62 is mounted on one of the upper support 41 and the lower support 31, and a second switch mating part 622 of the second rotation origin detection mechanism 62 is mounted on the other of the upper support 41 and the lower support 31. The second switch assembly 621 and the second switch mating part 622 of the second rotation origin detection mechanism 62 rotate relative to each other to control the second motor 30 to start or stop.

Figure 6:
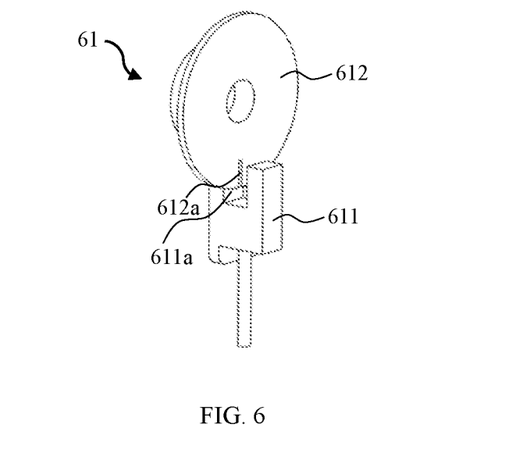
FIG. 6 is a schematic view of a first rotation origin detection mechanism in FIG. 3 in one embodiment.

Specifically, a first switch assembly 611 of the first rotation origin detection mechanism 61 is a photoelectric switch, and a first switch mating part 612 is a code disk. As shown in FIG. 3 and FIG. 6, in one possible design, for the first rotation origin detecting mechanism 61, as shown in FIG. 2b, the first switch mating part 612 (code disk) thereof is connected to the magnetic component 1 through the second rotation shaft 221, and the first switch assembly 611 is connected to the second end cap 25 of the lower support 31, so that the first switch mating part 612 can rotate relative to the first switch assembly 611 along with the rotation of the magnetic component 1. When the first switch assembly 611 (photoelectric switch) senses a detection part 612a of the first switch mating part 612 (code disk), it is determined that the magnetic component 1 reaches the first zero point. The first switch assembly 611 (photoelectric switch) is electrically connected to the first motor 20. When the magnetic component 1 rotates to the first zero point, the first switch assembly 611 (photoelectric switch) controls the first motor 20 to stop working.

As shown in FIG. 6, a detection part 612a of the first switch mating part 612 (code disk) can be a reflector or a notch. Accordingly, the first switch assembly 611 (photoelectric switch) can be provided with a groove 611a. When the detection part 612a of the first switch mating part 612 (code disk) is located in the groove 611a, the detection part 612a can cooperate with the first switch assembly 611 (photoelectric switch) to control the start and stop of a control circuit of the first motor 20. That is, an initial rotation position of the detection part 612a (when the power is not applied) is located in the groove 611a, and when the first switch assembly 611 (photoelectric switch) detects that the detection part 612a of the first switch mating part 612 (code disk) is located in the groove 611a, the magnetic component 1 rotates to the first zero point. During the rotation of the magnetic component 1, the first switch mating part 612 (code disk) can be driven to rotate, and when the detection part 612a is located in the groove 611a again, the first switch assembly 611 (photoelectric switch) detects the detection part 612a again, the magnetic component 1 returns to the first zero point, and the first switch assembly 611 (photoelectric switch) controls the first motor 20 to stop working.

Alternatively, in other embodiments of the present invention, the detection part 612a may have other structures as long as the magnetic component 1 can be controlled to stop at the origin of rotation. For example, the detection part 612a may be an annular thin-wall light barrier disposed on an outer edge of the first switch mating part 612 (code disk), and the light barrier has an opening or transparent portion. When the opening or transparent portion is located in the groove 611a, the first switch assembly 611 (photoelectric switch) can stop the magnetic component 1 at the first zero point by controlling the first motor 20. In a specific application, according to the different types of photoelectric switch (for example, an opposite type photoelectric switch, a slot type photoelectric switch, etc.), the detection part that can be cooperated with the photoelectric switch can be selected, specifically not to repeat, as long as it can control the magnetic component 1 to stop exactly at the first zero point.

Figure 4:
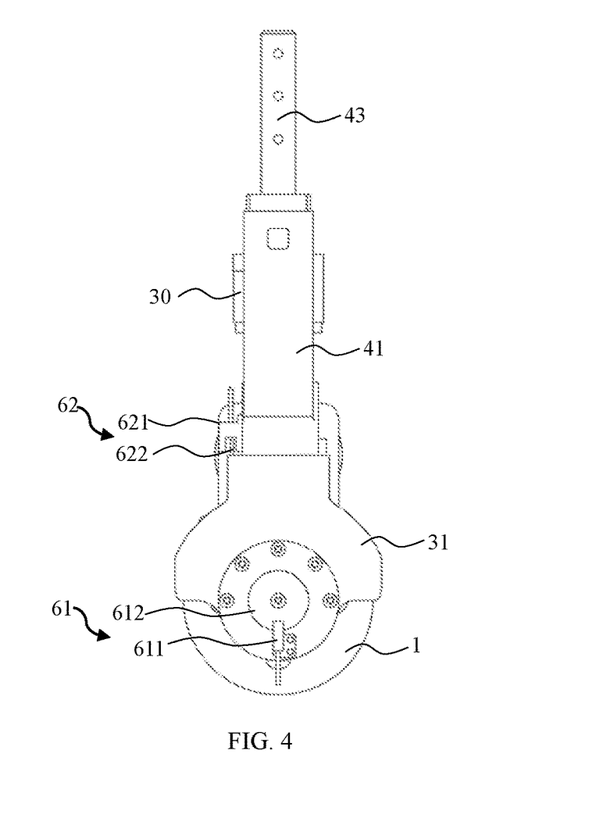
FIG. 4 is a side view of the magnetic control device shown in FIG. 1 in one embodiment.

In another embodiment, the second switch assembly 621 of the second rotation origin detection mechanism 62 is a photoelectric switch, and the second switch mating part 622 is a blocking member. As shown in FIG. 4 and FIG. 5, the second switch mating part 622 (blocking member) is connected to the lower support 31, and the second switch assembly 621 (photoelectric switch) is connected to the upper support 41, so that the second switch mating part 622 (blocking member) can rotate relative to the second switch assembly 621 (photoelectric switch) with the rotation of the lower support 31. When the second switch assembly 621 (photoelectric switch) senses the second switch mating part 622 (blocking member), that is, the second switch assembly 621 (photoelectric switch) is blocked by the second switch mating part 622 (blocking member), it is determined that the magnetic component 1 has rotated to the second zero point. The second switch assembly 621 (photoelectric switch) is electrically connected to the second motor 30. When the magnetic component 1 rotates to the second zero point, the second switch assembly 621 (photoelectric switch) controls the second motor 30 to stop working.

When the second switch mating part 622 is a blocking member, at least part of the blocking member is a detection part of the second switch mating part 622.

In the embodiment, the cooperation between the switch assembly and the switch mating part can identify the rotational position of the magnetic component 1. When the magnetic component 1 is located at the origin of rotation, the switch assembly controls the first motor 20 and/or the second motor 30 to stop working, so as to control the magnetic component 1 to stop rotating, which is convenient to find the origin of rotation of the magnetic component 1 and determine the initial position of the capsule endoscope. Meanwhile, the magnetic component 1 is determined to rotate at least one circle, so that the capsule endoscope in the human body is driven to rotate at least one circle through the change of the magnetic field of the magnetic component 1, and the capsule endoscope can observe the internal conditions of the stomach of the human body more completely.

Alternatively, in the embodiments of the present invention, the rotation of the magnetic component 1 may also be controlled according to the actual rotation circles of the magnet 11 (that is, the number of times that the magnet 11 passes through the origin of rotation is detected). For example, a threshold value of the number of times that the photoelectric switch detects that the magnet 11 passes the origin of rotation can be set, and when it is detected that the number of times that the magnet 11 passes through the origin of rotation exceeds the threshold value, the photoelectric switch can control the first motor 20 and/or the second motor 30 to stop working. Specifically, the threshold value may be set to 150, that is, the photoelectric switch detects that the magnet 11 passes the origin of rotation 150 times.

In addition, the switch assembly in the rotation origin detection mechanism 6 can also be a microswitch group, and the switch mating part can also be a contact mating part. With a relative rotation between the microswitch group and the contact mating part, when the microswitch group detects the contact mating part, a control circuit of the microswitch group is turned off to control the first motor 20 and/or the second motor 30 to stop working.

The microswitch group is electrically connected to the first motor 20 and/or the second motor 30, and comprises a microswitch and a contact portion, wherein the microswitch is provided with a contact mating part which can be cooperated with the contact portion, and the on/off of the control circuit is controlled by the contact and separation of the contact portion and the contact mating part. The microswitch group is disposed at the origin of rotation position of the magnetic component 1, one of the contact portion and the microswitch is configured to rotate with the rotation of the magnetic component 1, and the other is fixed, and the two can cooperate with each other to control the on/off of the control circuit, so that the magnetic component 1 can stop at the origin of rotation.

In order to adjust the first motor 20 and the second motor 30 respectively, at least two microswitch groups are provided to control the magnetic component 1 to stop at the first zero point and control the magnetic component 1 to stop at the second zero point respectively. In one embodiment, the microswitch group (not shown in FIGs) is disposed on the upper support 41, the contact portion (not shown in FIGs) is an action reed, and the contact mating part (not shown in FIGs)) is a bump disposed on the lower support 31 and protruding toward the microswitch group, and the bump rotates with the lower support 31. When the bump contacts with the action reed, the microswitch controls the first motor 20 to stop working, and the magnetic component 1 stops at the first zero point. In addition, the microswitch group is also disposed on the lower support 31, and the bump is disposed on the upper support 41 and rotates with the upper support 41. When the bump contacts the action reed, the microswitch controls the second motor 30 to be turned off, and the magnetic component 1 stops at the second zero point, which is convenient for the operator to use.

In addition, the present invention further provides a control system of a capsule endoscope, which comprises the magnetic control device mentioned above and a position adjusting device (not shown in the FIGs) for adjusting the position of the magnetic control device. It should be pointed out that the position adjusting device can refer to the Chinese Patent Application No. 201310136094.0, that is, the position adjusting device is a three-axis (i.e., X-axis, Y-axis and Z-axis) displacement base, which is used to change the position of the magnetic control device. The control system has the same beneficial effects as the magnetic control device, and is not described here.

The person skilled in the art realizes that the present invention by no means is limited to the preferred embodiments described above. On the contrary, many modifications and variations are possible within the scope of the appended claims. Any modifications, equivalent substitutions, improvements, etc. made within the spirit and principles of this disclosure are intended to be included within the scope of the present invention.

The invention claimed is:

1. A magnetic control device for a capsule endoscope, for adjusting the state and/or action of the capsule endoscope, the magnetic control device comprising:

an upper support and a lower support, wherein the lower support is rotatably mounted on the upper support, the upper support comprises a first mounting space, and a second mounting space is formed between the upper support and the lower support;

a magnetic component mounted on the lower support for driving the capsule endoscope to move;

a first rotation assembly mounted on the lower support for driving the magnetic component to rotate around a first rotation axis, wherein the first rotation assembly comprises a first motor, and at least part of the first motor is located in the second mounting space;

a second rotation assembly mounted on the lower support and the upper support for driving the magnetic component and the first rotation assembly to rotate around a second rotation axis, wherein the second rotation assembly comprises a second motor, and at least part of the second motor is located in the first mounting space; and wherein the first rotation axis and the second rotation axis have an angle therebetween, the lower support comprises a third housing and a mounting portion, wherein the mounting portion is located between the upper support and a third housing, the mounting portion is rotatably mounted on the upper support, and the mounting portion is located within a projection range of the third housing and the upper support along the second rotation axis; and at least part of the magnetic component is mounted on the third housing, and the first motor is mounted on the mounting portion;

the second rotation assembly comprises a second transmission portion, and the second transmission portion comprises a transmission shaft arranged along the second rotation axis; and one end of the transmission shaft is connected to the second motor, and the other end of the transmission shaft is fixed to the lower support, the second transmission portion further comprises a support member connected to the transmission shaft, and a second bearing is sleeved around an outer circumference of the transmission shaft; and the support member is disposed between the second bearing and the transmission shaft.

2. The magnetic control device of claim 1, wherein
the upper support at least comprises a first mounting plate, a second mounting plate and a third mounting plate,
wherein the first mounting plate, the second mounting plate and the third mounting plate enclose a U-shaped first mounting space.

3. The magnetic control device of claim 1, wherein
the third housing is a partially spherical structure.

4. The magnetic control device of claim 1, wherein
the first rotation assembly is mounted on a side of the lower support where the magnetic component is not disposed.

5. The magnetic control device of claim 4, wherein
the magnetic component comprises a magnet and a mounting cavity, and the magnet is mounted in the mounting cavity; and
the mounting cavity is provided with a rotation shaft along the first rotation axis, the lower support is provided with a first through hole along the direction of the first rotation axis, and the rotation shaft passes through the first through hole.

6. The magnetic control device of claim 5, wherein
the lower support comprises two first through holes arranged opposite to each other along the direction of the first rotation axis;
the rotation shaft comprises a first rotation shaft and a second rotation shaft, wherein
the first rotation shaft passes through one of the first through holes, and the second rotation shaft passes through the other first through hole; and
the first rotation shaft is connected to the first motor through a first transmission portion.

7. The magnetic control device of claim 6, wherein
the lower support further comprises a first end cap and a second end cap,
wherein the first end cap and the second end cap are respectively disposed at the two first through holes and connected to the third housing of the lower support;
the first rotation shaft is rotatably disposed on the first end cap, and the first transmission portion is fixed on the first end cap; and
the second rotation shaft is rotatably disposed on the second end cap.

8. The magnetic control device of claim 5, wherein
the mounting cavity at least comprises a first housing and a second housing,
wherein the first housing and the second housing enclose an inner cavity of the mounting cavity; and
the first rotation shaft is provided in the first housing, and the second rotation shaft is provided in the second housing.

9. The magnetic control device of claim 1, wherein
at least one of the first motor and the second motor is a stepper motor; and
torques of the first motor and the second motor are not less than 0.7N·m.

10. The magnetic control device of claim 1, wherein
the magnetic control device further comprises at least one rotation origin detection mechanism for determining whether the magnetic component is at an origin of rotation; and
the rotation origin detection mechanism comprises a switch assembly electrically connected to the first motor and/or the second motor, and a switch mating part configured to cooperates with the switch assembly, the switch assembly including a control circuit configured to be turned off when the magnetic component is at the origin of rotation.

11. The magnetic control device of claim 10, wherein
the rotation origin detection mechanism comprises a first rotation origin detection mechanism, which is mounted at the connection between the magnetic component and the lower support, and comprises a first switch assembly and a first switch mating part; and
the first switch assembly is mounted on one of the magnetic component and the lower support, the first switch mating part is mounted on the other of the magnetic component and the lower support, and the first switch assembly and the first switch mating part control the start and stop of the first motor through a relative rotation.

12. The magnetic control device of claim 10, wherein
the rotation origin detection mechanism comprises a second rotation origin detection mechanism, which is mounted at the connection between the upper support and the lower support, and comprises a second switch assembly and a second switch mating part; and
the second switch assembly is mounted on one of the upper support and the lower support, the second switch mating part is mounted on the other of the upper support and the lower support, and the second switch assembly and the second switch mating part control the start and stop of the second motor through a relative rotation.

13. The magnetic control device of claim 10, wherein
the switch assembly is a photoelectric switch, and the switch mating part is provided with a detection part; and
with a relative rotation between the photoelectric switch and the switch mating part, when the photoelectric switch detects the detection part, a control circuit of the photoelectric switch is turned off, and the magnetic component stops at the origin of rotation.

14. The magnetic control device of claim 1, wherein
the magnetic control device further comprises a slip ring, and the slip ring comprises an upper slip ring and a lower slip ring;
the upper slip ring is mounted on the upper support and is electrically connected to a power supply, and the lower slip ring is mounted on the lower support and is electrically connected to the first motor; and
the slip ring is a PCB type slip ring, and the thickness of the PCB type slip ring is less than or is equal to 10 mm.

15. A control system of a capsule endoscope, comprising the magnetic control device of claim 1 and a position adjusting device for adjusting the position of the magnetic control device.

* * * * *